US012189045B2

(12) United States Patent
Säily et al.

(10) Patent No.: US 12,189,045 B2
(45) Date of Patent: Jan. 7, 2025

(54) UE LOCATION TRACKING IN AN INACTIVE STATE

(71) Applicant: NOKIA TECHNOLOGIES OY, Espoo (FI)

(72) Inventors: Mikko Säily, Laukkoski (FI); Elena Virtej, Espoo (FI); Diomidis Michalopoulos, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 310 days.

(21) Appl. No.: 17/636,391

(22) PCT Filed: Aug. 19, 2019

(86) PCT No.: PCT/EP2019/072162
§ 371 (c)(1),
(2) Date: Feb. 18, 2022

(87) PCT Pub. No.: WO2021/032280
PCT Pub. Date: Feb. 25, 2021

(65) Prior Publication Data
US 2022/0299589 A1   Sep. 22, 2022

(51) Int. Cl.
G01S 5/00 (2006.01)
H04W 64/00 (2009.01)
(Continued)

(52) U.S. Cl.
CPC .......... G01S 5/0027 (2013.01); G01S 5/0036 (2013.01); H04W 64/00 (2013.01); H04W 76/19 (2018.02); H04W 76/20 (2018.02)

(58) Field of Classification Search
CPC .... G01S 5/0027; G01S 5/0036; H04W 64/00; H04W 76/19; H04W 76/20
(Continued)

(56) References Cited

U.S. PATENT DOCUMENTS

2018/0054796 A1*  2/2018  Edge ...................... H04W 4/029
2019/0191406 A1*  6/2019  Wei ....................... H04W 64/00
2020/0389759 A1* 12/2020  Wang ..................... H04W 4/023

FOREIGN PATENT DOCUMENTS

WO   WO 2018/217323 A1   11/2018

OTHER PUBLICATIONS

International Search Report and Written Opinion dated May 6, 2020 corresponding to International Patent Application No. PCT/EP2019/072162.

(Continued)

Primary Examiner — Don N Vo
(74) Attorney, Agent, or Firm — Lippes Mathias LLP

(57) ABSTRACT

In accordance with some example embodiments, a method may include transmitting, by a network entity, at least one positioning measurement configuration associated with at least one radio access network notification area to a user equipment. The method may further include receiving, by the network entity, at least one location message. The method may further include transmitting, by the network entity, at least one location message response The at least one location message response comprises at least one last known location of the user equipment transmitted to the location management entity or at least one last location-associated measurement by the user equipment transmitted to the location management entity.

13 Claims, 9 Drawing Sheets

(51) Int. Cl.
*H04W 76/19* (2018.01)
*H04W 76/20* (2018.01)

(58) Field of Classification Search
USPC .................................................. 455/456.1
See application file for complete search history.

(56) References Cited

OTHER PUBLICATIONS

3GPP TR 38.855 V16.0.0 (Mar. 2019), Technical Report, 3rd Generation Partnership Project; Technical Specification Group Radio Access Network; Study on NR positioning support (Release 16), Mar. 2019.
3GPP TS 23.273 V16.0.0 (Jun. 2019), Technical Specification, 3rd Generation Partnership Project; Technical Specification Group Services and System Aspects; 5G System (5GS) Location Services (LCS); Stage 2 (Release 16), Jun. 2019.
3GPP TS 23.502 V16.1.1 (Jun. 2019), Technical Specification, 3rd Generation Partnership Project; Technical Specification Group Services and System Aspects; Procedures for the 5G System; Stage 2 (Release 16), Jun. 2019.
3GPP TS 23.271 V15.1.0 (Sep. 2018), Technical Specification, 3rd Generation Partnership Project; Technical Specification Group Services and System Aspects; Functional stage 2 description of Location Services (LCS) (Release 15), Sep. 2018.
3GPP TS 38.305 V15.4.0 (Jun. 2019), Technical Specification, 3rd Generation Partnership Project; Technical Specification Group Radio Access Network; NG Radio Access Network (NG-RAN); Stage 2 functional specification of User Equipment (UE) positioning in NG-RAN (Release 15), Jun. 2019.

\* cited by examiner

UE LOCATION TRACKING IN AN INACTIVE STATE

BACKGROUND

Field

Certain example embodiments may relate to communication systems. For example, some example embodiments may relate to location tracking of user equipment.

Description of the Related Art

Third Generation Partnership Project (3GPP), technical report (TR) 38.855 discusses techniques for supporting new radio (NR) positioning. Specifically, section 9.3.1, entitled "NG-RAN support for location management functions, a.k.a Location Management Component (LMC)," describes an architecture variant for obtaining low latency and high-performance location estimates. To expand on this concept, local location management functionality is being studied, including the location of a local location management function (LMF) at NG-RAN, potential new interfaces, any impact on existing protocols, and coordination with the LMF within the fifth generation (5G) core network.

SUMMARY

In accordance with some example embodiments, a method may include transmitting, by a network entity, at least one positioning measurement configuration associated with at least one radio access network notification area to a user equipment configured to transition the user equipment to an inactive state in response to a determination that unicast activity with the user equipment is below at least one pre-determined threshold. The method may further include receiving, by the network entity, at least one location message. The method may further include transmitting, by the network entity, at least one location message response. The at least one location message response may comprise at least one last known location of the user equipment transmitted to the location management entity, or at least one last location-associated measurement by the user equipment transmitted to the location management entity.

In accordance with some example embodiments, an apparatus may include means for transmitting at least one positioning measurement configuration associated with at least one radio access network notification area to a user equipment configured to transition the user equipment to an inactive state in response to a determination that unicast activity with the user equipment is below at least one pre-determined threshold. The apparatus may further include means for receiving at least one location message. The apparatus may further include means for transmitting at least one location message response. The at least one location message response may comprise at least one last known location of the user equipment transmitted to the location management entity, or at least one last location-associated measurement by the user equipment transmitted to the location management entity.

In accordance with some example embodiments, an apparatus may include at least one processor and at least one memory including computer program code. The at least one memory and the computer program code can be configured to, with the at least one processor, cause the apparatus to at least transmit at least one positioning measurement configuration associated with at least one radio access network notification area to a user equipment configured to transition the user equipment to an inactive state in response to a determination that unicast activity with the user equipment is below at least one pre-determined threshold. The at least one memory and the computer program code can be further configured to, with the at least one processor, cause the apparatus to at least receive at least one location message. The at least one memory and the computer program code can be further configured to, with the at least one processor, cause the apparatus to at least transmit at least one location message response. The at least one location message response may comprise at least one last known location of the user equipment transmitted to the location management entity, or at least one last location-associated measurement by the user equipment transmitted to the location management entity.

In accordance with some example embodiments, a non-transitory computer readable medium can be encoded with instructions that may, when executed in hardware, perform a method. The method may include transmitting at least one positioning measurement configuration associated with at least one radio access network notification area to a user equipment configured to transition the user equipment to an inactive state in response to a determination that unicast activity with the user equipment is below at least one pre-determined threshold. The method may further include receiving at least one location message. The method may further include transmitting at least one location message response. The at least one location message response may comprise at least one last known location of the user equipment transmitted to the location management entity, or at least one last location-associated measurement by the user equipment transmitted to the location management entity.

In accordance with some example embodiments, a computer program product may perform a method. The method may include transmitting at least one positioning measurement configuration associated with at least one radio access network notification area to a user equipment configured to transition the user equipment to an inactive state in response to a determination that unicast activity with the user equipment is below at least one pre-determined threshold. The method may further include receiving at least one location message. The method may further include transmitting at least one location message response. The at least one location message response may comprise at least one last known location of the user equipment transmitted to the location management entity, or at least one last location-associated measurement by the user equipment transmitted to the location management entity.

In accordance with some example embodiments, an apparatus may include circuitry configured to transmit at least one positioning measurement configuration associated with at least one radio access network notification area to a user equipment configured to transition the user equipment to an inactive state in response to a determination that unicast activity with the user equipment is below at least one pre-determined threshold. The circuitry may further be configured to receive at least one location message. The circuitry may further be configured to transmit at least one location message response. The at least one location message response may comprise at least one last known location of the user equipment transmitted to the location management entity, or at least one last location-associated measurement by the user equipment transmitted to the location management entity.

In accordance with some example embodiments, a method may include receiving, by a user equipment, at least one positioning measurement configuration from a network entity in response to a determination that unicast activity with the user equipment is below at least one pre-determined threshold. The method may further include transitioning, by the user equipment, to an inactive mode. The method may further include transmitting, by the user equipment, at least one location message to the network entity. The at least one location message response may comprise at least one last known location of the user equipment transmitted to the location management entity, or at least one last location-associated measurement by the user equipment transmitted to the location management entity.

In accordance with some example embodiments, an apparatus may include means for receiving at least one positioning measurement configuration from a network entity in response to a determination that unicast activity with the user equipment is below at least one pre-determined threshold. The apparatus may further include means for transitioning to an inactive mode. The apparatus may further include means for transmitting at least one location message to the network entity. The at least one location message response may comprise at least one last known location of the user equipment transmitted to the location management entity, or at least one last location-associated measurement by the user equipment transmitted to the location management entity.

In accordance with some example embodiments, an apparatus may include at least one processor and at least one memory including computer program code. The at least one memory and the computer program code can be configured to, with the at least one processor, cause the apparatus to at least receive at least one positioning measurement configuration from a network entity in response to a determination that unicast activity with the user equipment is below at least one pre-determined threshold. The at least one memory and the computer program code can be further configured to, with the at least one processor, cause the apparatus to at least transition to an inactive mode. The at least one memory and the computer program code can be further configured to, with the at least one processor, cause the apparatus to at least transmit at least one location message to the network entity. The at least one location message response may comprise at least one last known location of the user equipment transmitted to the location management entity, or at least one last location-associated measurement by the user equipment transmitted to the location management entity.

In accordance with some example embodiments, a non-transitory computer readable medium can be encoded with instructions that may, when executed in hardware, perform a method. The method may include receiving at least one positioning measurement configuration from a network entity in response to a determination that unicast activity with the user equipment is below at least one pre-determined threshold. The method may further include transitioning to an inactive mode. The method may further include transmitting at least one location message to the network entity. The at least one location message response may comprise at least one last known location of the user equipment transmitted to the location management entity, or at least one last location-associated measurement by the user equipment transmitted to the location management entity.

In accordance with some example embodiments, a computer program product may perform a method. The method may include receiving at least one positioning measurement configuration from a network entity in response to a determination that unicast activity with the user equipment is below at least one pre-determined threshold. The method may further include transitioning to an inactive mode. The method may further include transmitting at least one location message to the network entity. The at least one location message response may comprise at least one last known location of the user equipment transmitted to the location management entity, or at least one last location-associated measurement by the user equipment transmitted to the location management entity.

In accordance with some example embodiments, an apparatus may include circuitry configured to receive at least one positioning measurement configuration from a network entity in response to a determination that unicast activity with the user equipment is below at least one pre-determined threshold. The circuitry may further be configured transition to an inactive mode. The circuitry may further be configured to transmit at least one location message to the network entity. The at least one location message response may comprise at least one last known location of the user equipment transmitted to the location management entity, or at least one last location-associated measurement by the user equipment transmitted to the location management entity.

BRIEF DESCRIPTION OF THE DRAWINGS

For proper understanding of this disclosure, reference should be made to the accompanying drawings, wherein.

DETAILED DESCRIPTION

Figure 1:
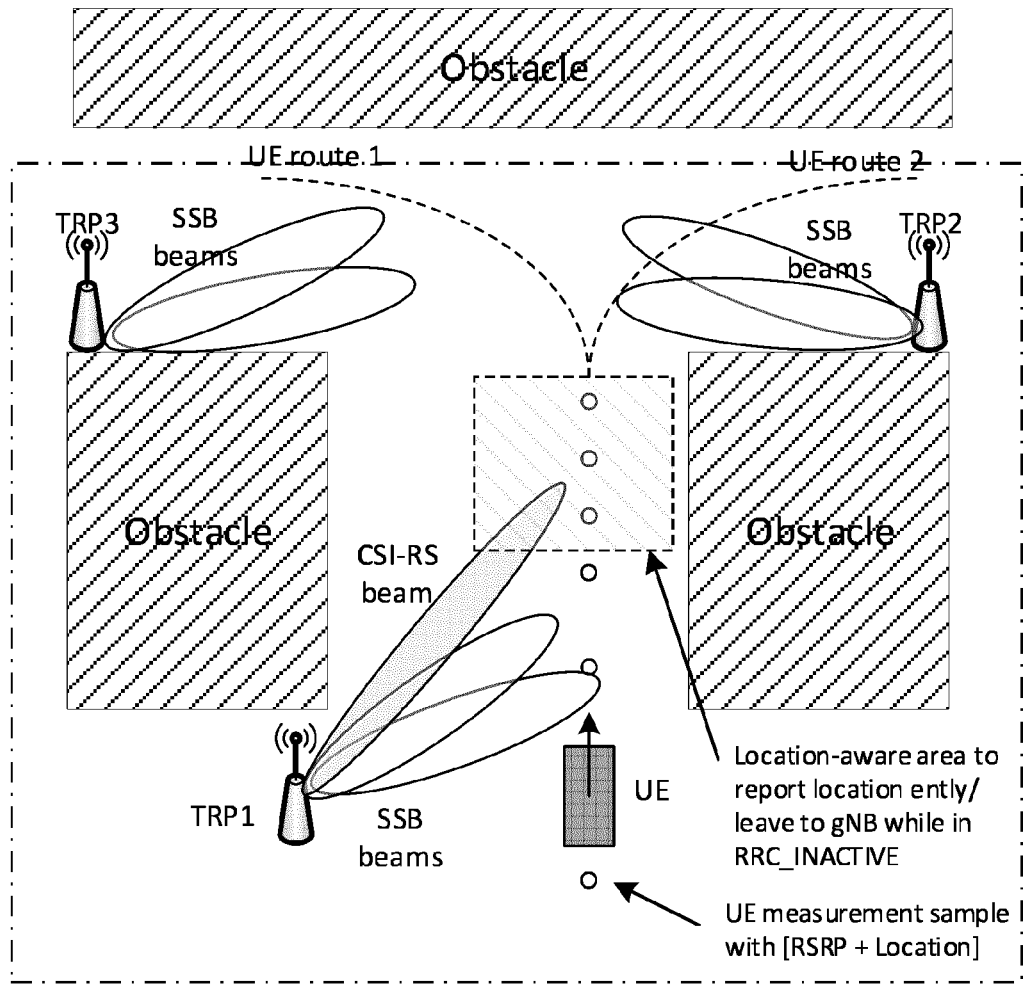
FIG. 1 illustrates an example of location tracking of a user equipment in an inactive state.

3GPP is currently developing the positioning of user equipment (UE) for regulator and commercial use cases where user equipment positioning procedures are performed in a connected state, such as RRC_CONNECTED. Specifically, when a UE enters a period of low or zero network activity, positioning-specific observed time difference of arrival (OTDOA) measurements may be stopped, and no further uplink time difference of arrival (UTDOA) uplink signals may be transmitted from the UE to the network entity. Under current 3GPP standards, the UE is unable to report to the network any positioning measurements when operating in an inactive state without the UE transitioning back to a connected state and restarting the positioning protocol to request the positioning.

3GPP TS 23.273, entitled "5G System (5GS) Location Services (LCS); Stage 2, Release 16," describes location service procedures where, if the UE is in a CM-IDLE state, the UE initiates a UE-triggered service request as defined in clause 4.2.3.2 of TS 23.502, in order to establish a signalling connection with the access and mobility function (AMF). Similarly, 3GPP TS 23.271, section 8.7, entitled "LCS State description for MME," discusses a mobility management entity (MME) supporting at least one location session for any UE at any time. A location session may be invoked by the MME in order to obtain the location of the UE or perform some other location related service such as transferring assistance data to the UE. In LCS-Idle, the MME location service is inactive for a particular UE, while in LOCATION state, the MME awaits a response from an evolved serving mobile location center (E-SMLC) after requesting a location service for a particular UE.

However, these techniques require a tight coupling of UE radio resource control (RRC) states with the network entity and LMF/MME, as well as the UE to the RAN, and further results in the core network continuously signaling between several network entities. Furthermore, there exists no support for the mobility of location sessions during low activity periods. For example, where the UE is in a low activity state, and the UE moves outside of the coverage of the last serving cell, the session fails, and a new positioning request is required. Thus, reestablishing a positioning session during or after a low activity state requires several signaling steps.

Further, none of the existing techniques described above provide frequent updates for positioning assistance information, such as when the UE is transitioning between a connected and inactive state. This problem expands further since a UE may be classified as being low activity with infrequent, small data applications, such as mMTC (massive machine type communications) or keep-alive messaging. As a result, state transitions between connected and inactive/idle may cause significant interruption to positioning procedures, needlessly consume additional power, and delay the reporting of location measurements due to frequent session restarts and increased signalling.

To address these disadvantages, certain example embodiments described herein may eliminate overhead related to positioning functions, as well as additional latency between the RAN and core network during state transitions between RRC_INACTIVE and RRC_CONNECTED, which may decrease power consumption due to reduced signaling overhead. Furthermore, various embodiments may also provide at least one location and/or positioning measurement using early data transmission (EDT), as well as immediately after RRC resumes from a transition from RRC_INACTIVE to RRC_CONNECTED state.

Furthermore, although an AMF and/or LMF/LMC may be unaware that the UE has been suspended due to low or no unicast activity, the UE may continue to perform positioning estimations and/or measurements during RRC_INACTIVE state. In addition, when performing UE-based positioning methods, the UE may trigger at least one location-based Ax event, such as A1, A2, A3, etc., when operating in a low activity state, such as RRC_INACTIVE, based upon the estimated location. Additionally, a UE may perform positioning measurements without experiencing any measurement gaps during the RRC_ACTIVE state. Some embodiments may also enable a LMC or last-serving NE to configure a UE to perform reference signal time difference (RSTD) measurements in alignment with paging discontinuous reception (DRX) cycles. Certain example embodiments are, therefore, directed to improvements in computer-related technology, for example, by improving network reliability, conserving network resources, and reducing wasted power consumption of network entities and/or user equipment located within the network due to repetitive signaling.

Certain embodiments described below relate to a method where the tracking of the position of user equipment may be maintained during an inactive state when unicast activity is low or zero. Specifically, the position of the UE may be made available to the LMC (in RAN) or the LMF (in core) following the UE resuming a connected state.

In some embodiments, where a UE-based positioning method is used, the UE may track its position and report to the LMC/LMF after re-entering a connected state. Alternatively, where a UE-assisted positioning method is used, the UE may track updated location measurements over time, eventually reporting them to the LMC/LMF when re-entering a connected state for estimating the latest position of the UE. Furthermore, where the UE is configured with location-aware reporting events, and the reporting event is satisfied, the UE may report its location (or the latest update of the positioning measurements), depending on whether a UE-based or UE-assisted method is used by the UE, by using an EDT.

Furthermore, UE positioning measurements and their related procedures may be decoupled from the RAN during an inactive state, such as RRC_INACTIVE. Specifically, the UE in the inactive state may appear as being in a CM-Connected state from the connection management perspective, and thus, the AMF and the LMF may assume that the UE position may be obtained and the location client/service (LCS) clients may request the location of the UE.

As noted above, some embodiments described herein may enable location-aware mobility during low activity period, as well as low latency position reporting when the RRC is resumed and the UE is connected to the network. In this way, no positioning-related signaling overhead is required between the RAN and core during state transitions between RRC_INACTIVE and RRC_CONNECTED. Location awareness during RRC_INACTIVE periods may be used to increase the mobility robustness, minimize resource utilization during mobility, and optimize the RAN notification area when the positioning measurements are exposed to RRC.

As illustrated in FIG. 1, a UE in an RRC_INACTIVE state may be triggered to perform cell reselection with a preferred transmission reception point (TRP). For example, if the UE follows UE route 1, the reselection may be performed to TRP3, where the RAN notification area consists of TRP1 and TRP3. Certain techniques described below relate to UE location information being fully or partially exposed to RRC. In addition, the positioning architecture may support location aware trigger events in RRC states Connected and Inactive, as well as RRC state Idle. Further, 3GPP may specify that the location management functionality in RAN, which may be the LMC, in order to account for low-latency positioning use cases and allow minimum signaling overhead between RAN and the core network for UE configuration and processing the location related computations. This may allow management of location aware trigger events between UE and serving network entities without additional overhead.

Figure 3:
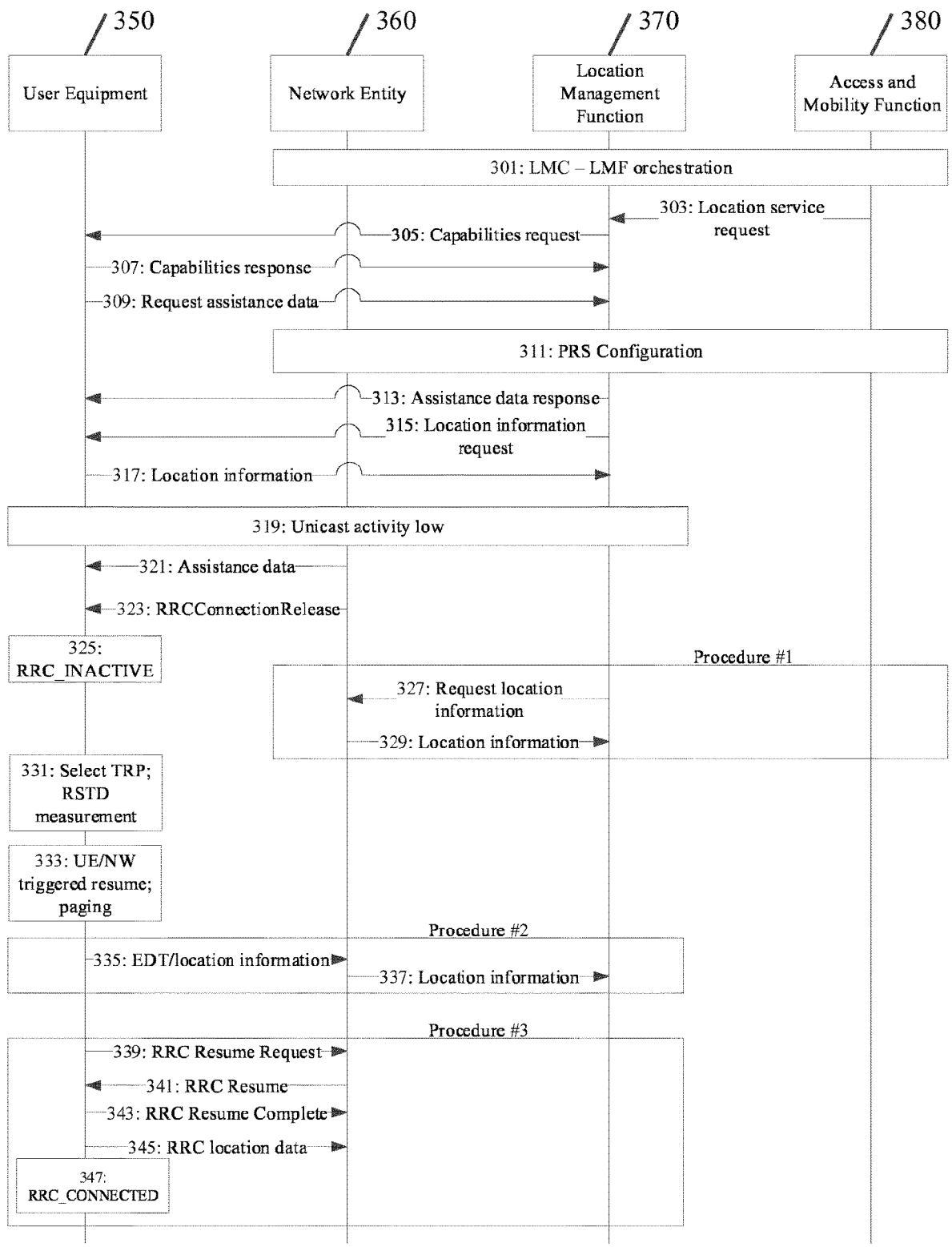
FIG. 3 illustrates an example of a signaling diagram according to certain example embodiments.

FIG. 3 illustrates an example of a signalling diagram according to some example embodiments. UE 350, NE 360, LMF 370, and AMF 380 may be respectively similar to UE 720, NE 710, NE 710, and NE 710 in FIG. 7, discussed below. Although only a single UE, NE, LMF, and AMF are illustrated, a communications network may contain one or more of each of these entities. NE 360 may further comprise at least one location management component. In some embodiments, UE 350 may be configured with at least one standard UE-positioning method, such as 3GPP TS 23.273 and/or 38.305, which may be UE-based or UE-assisted.

In step 301, in order to begin configuring and enabling the positioning of UE 350 in a low activity state, such as RRC_INACTIVE, NE 360, LMF 370, and/or AMF 380 may perform a set of LMC-LMF orchestration activities. For example, such orchestration activities may comprise signaling between NE 360, LMF 370 and AMF 380, specifying whether NE 360 or LMF 370 may process a given positioning request based upon, for example, the positioning latency requirements of such request, as well as actions taken in the event that future positioning requests are received. In step 303, AMF 380 may transmit at least one location service request to LMF 370. In step 305, LMF 370 may transmit at least one capabilities request to UE 350. In step 307, UE 350 may transmit at least one capabilities response to LMF 370. In step 309, UE 350 may transmit at least one request for assistance data to LMF 370, and in step 311, NE 360, LMF 370, and/or AMF 380 may perform a positioning reference signals (PRS) configuration actions. Such may correspond with the dynamic configuration of PRS, such that, depending on the positioning requests in a given area and the overall resource availability, the amount of resources allocated for PRS transmissions is adjusted. In step 313, in response to the at least one request for assistance data, LMF 370 may transmit at least one assistance data response to UE 350. In step 315, LMF 370 may transmit at least one location information request to UE 350, while in step 317, in response to the at least one location information request, UE 350 may transmit at least one location information indication to LMF 370. In certain embodiments, the location of UE 350 may be known using the normal location service procedures, including the last known location of UE 350 in the network, i.e., NE 360 and/or LMF 370.

In step 319, UE 350, NE 360, and/or LMF 370 may detect that unicast activity associated with UE 350 is zero or below at least one predetermined threshold. For example, the at least one predetermined threshold may be based upon empty data buffers.

In step 321, NE 360 may transmit positioning assistance data to UE 350, which may be in an active state, such as RRC_ACTIVE. The positioning assistance data may be associated with at least one configured radio access network notification area (RNA), and/or may be associated with at least one UE-based and/or at least one UE-assisted positioning method. For example, the positioning assistance data may comprise information related to the at least one UE-based and/or at least one UE-assisted positioning method.

In some embodiments, the positioning assistance data may comprise at least one weight and/or reliability indication for at least one TRP coordinate. For example, the at least one weight and/or reliability indication may be configured for UE 350 to determine which, if any, TRPs it should attempt to measure, and/or which TRPs, if any, should be weighted during positioning measurements. The at least one weight and/or reliability indication may provide the ability for multiple TRPs to be deployed in a variety of locations, for example, at locations above obstacles to provide line of sight (LOS) signals and more accurate measurements, and at locations below obstacles which provide less accurate measurements due to reflections and multipath propagation.

In various embodiments, multipath propagation, and resulting inaccuracies, may be addressed using at least one machine learning solution by NE 360, LMF 370, and/or AMF 380. For example, at least one machine learning model may generate at least one predicted location based upon at least one measurement on at least one cell reported by UE 350. Additionally or alternatively, at least one machine learning training phase may be based upon respective measurements by UE 350 across at least one consecutive time instance, enabling predictions of future locations of UE 350 and associating these predictions with at least one configured RNA. In certain embodiments, such machine learning techniques may improve line of sight detection and/or estimated location with respect to the true location of UE 350 during positioning. Since distortions due to line of sight and/or time-variant propagation delay may affect the measured reference signal time difference (RSTD), it is desirable to use these machine learning techniques to reduce this effect.

In some embodiments where UE 350 performs periodic reporting, if the location-enhanced trigger event is not configured to trigger at least one measurement report within at least one configured time window, NE 360 and/or LMF 370 may trigger at least one RRCReconfiguration message to UE 350, for example, where UE 350 has stopped or modified at least one mobility profile and/or has not entered at least one RNA.

In step 323, NE 360 may transmit at least one RRCConnectionRelease message to UE 350. In some embodiments, the at least one RRCConnectionRelease message may comprise at least one positioning request during an inactive state, such as RRC_INACTIVE state. Additionally or alternatively, NE 360 may transmit at least one RRCReconfiguration message to UE 350 comprising at least one measurement configuration configured for positioning measurement and/or mobility. Furthermore, NE 360 may transmit at least one location aware trigger to UE 350 configured to cause UE 350 to report, based upon at least one positioning method used by UE 350, at least one UE location and/or at least one UE positioning measurement data. This may be performed during a transition to a connected state, such as RRC_CONNECTED, or using an early data transmission, such as described in 3GPP NR, Rel-15.

In some embodiments, NE 360 may transmit at least one RAT-dependent and/or at least one RAT-independent positioning measurement configuration, and/or at least one reporting event when unicast activity of UE 350 is stopped or below at least one predefined threshold.

In step 325, as a result of unicast activity being detected as stopped or below at least one predefined threshold, UE 350 may enter an inactive state, such as RRC_INACTIVE. In various embodiments, UE 350 may perform at least one standard cell re-selection measurement within at least one RNA and/or may transmit at least one RNA update indication to NE 360 and/or LMF 370 if UE 350 moves outside at least one mobility route of the RNA. The an inactive state may be entered with at least one RAT-dependent and/or RAT-independent positioning measurement configuration.

As noted above, UE 350 may be configured with at a UE-based method or UE-assisted method. If UE 350 is configured with a UE-based method, UE 350 may continue the positioning session as long as UE 350 stays within the at least one RNA. In some embodiments, UE 350 may perform measurements based upon one or more of known locations of TRPs, relative locations of TRPs, movement relative to the configured reference point, and movement relative to the configured trigger event area.

Alternatively, if UE 350 is configured with a UE-assisted method, UE 350 may continue to measure positioning-specific measurements, for example, the positioning reference signals such as PRS for the case of observed time difference of arrival (OTDOA) method. Furthermore, UE 350 may update/overwrite previous measurements at a predetermined rate such that the latest measurements would be available to be reported to the network upon request.

In step 327, LMF 370 may transmit at least one request for location information to NE 360. As an example, LMF 370 may transmit the at least one request for location information when UE 350 remains within the at least one RNA, and a result, not report a new location according to the at least one location-aware trigger event. In response, at step 329, NE 329 may transmit location information to LMF 370, for example, at least one previous known location of UE 350. In some embodiments, the location information may comprise at least one quality metric, such as reference signal received power (RSRP), and/or may be based upon at least one threshold configured to limit the RSTD measurements reported, for example, to only report the most relevant RSTD measurement.

In the case of UE-assisted methods, LMF 370 in the core network or LMC located at the last serving gNB-centralized unit (CU) 360 may host the positioning session. LMF 370 or LMC 360 may provide the last known location of UE 350 to at least one requesting LCS client without requiring the UE to resume a connected state, such as RRC_CONNECTED, such as in response to at least one quality of service (QoS) in the request. For example, if the QoS indicates that a more precise location is required, LMF 370 or LMC 360 may resume the connected state, provide the assistance data, and request at least one positioning measurement from UE 350.

In step 331, while in an inactive state, UE 350 may select at least one TRP, for example, when UE 350 moves within the at least RNA without notifying NE 360 and/or LMF 370. In some embodiments, based upon the at least one RRCRelease message and/or at least one RRCReconfiguration message, UE 350 may use at least one positioning measurement method, and associated configuration, within the at least one RNA. UE 350 may choose at least one configured TRP according to at least one predetermined quality metric associated with at least one RNA.

In various embodiments, when UE 350 applies at least one UE-based method, UE 350 may maintain an exact location if at least one TRP is known, and/or a relative location to at least one previously known location. Additionally or alternatively, UE 350 may repeatedly update at least one positioning measurement based upon at least one configuration, for example, such that at least one most recent measurement may be available to report to NE 360 and/or LMF 370 upon receiving at least one request for location measurement data.

Figure 2:
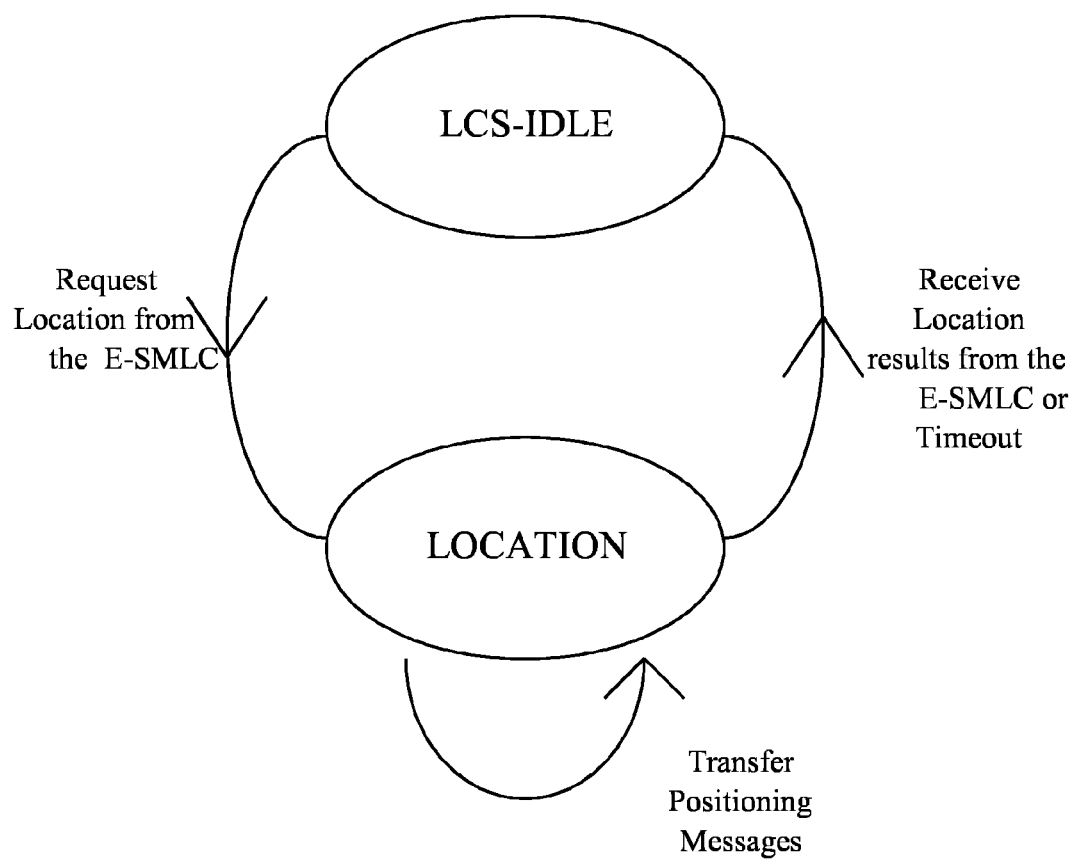
FIG. 2 illustrates an example of state transitions within a mobility management entity.

In step 333, while in an inactive state, UE 350 may trigger at least one state transition operation to transition to at least one connected state, such as RRC_CONNECTED, for example, when entering and/or leaving at least one RNA, such as illustrated in FIG. 2. For example, UE 350 may trigger at least one RNA update, and/or may report at least one location when leaving the at least one RNA.

In step 335, when configured with at least one location aware event trigger, UE 350 may transmit at least one EDT and/or at least one location information indication to NE 360. In some embodiments, the at least one EDT may comprise at least one indication of the location of UE 350 and/or at least one positioning measurement performing during an inactive state of UE 350, such as RRC_INACTIVE. Additionally or alternatively, the at least one location information indication may be comprised within at least one random access procedure message 3. In response, in step 337, NE 360 may transmit the at least one location information indication to LMF 370, which may be configured to complement at least one previously reported location of UE 350 in step 327, as described above.

In step 339, when configured with at least one location aware event trigger, UE 350 may transmit at least one RRCResumeRequest message to NE 360, which may be configured to trigger at least one transition to a connected state, such as RRC_CONNECTED.

In step 341, NE 360 may transmit at least one RRCResume message to UE 350. In some embodiments, based upon the positioning method applied by UE 350, the at least one RRCResume message may comprise at least one indication configured to report the location of UE 350 and/or positioning measurements of UE 350.

In step 343, UE 350 may transmit at least one RRCResumeComplete message to NE 360, which, for example, may comprise at least one location and/or at least one positioning measurement.

In step 345, UE 350 may transmit RRC location data to NE 360, which, for example, may comprise at least one location data measurement performed during an inactive state of UE 350.

In step 347, UE 350 may enter at least one connected mode, such as RRC_CONNECTED, and may be configured to report the location of UE 350 to LMF 370 and/or to report the latest positioning measurements. For example, UE 350 may report its location and/or at least one positioning measurement to LMF 370 using at least one LTE positioning protocol (LPP) independent of step 301-325. Additionally or alternatively, where LMF 370 is configured as an LMC, at least one RRC protocol may be used to transmit the location of UE 350 and/or at least one positioning measurement to the LMC. For UE-based methods, the latest estimated position may be used, while for UE-assisted methods, at least the latest measurement may be reported to the network to resume the position of the UE.

In some embodiments, where UE 350 is configured with at least one UE-based method, UE 350 may trigger at least one Ax event, such as A1, A2, A3, etc., when in a low activity state, such as RRC_INACTIVE, in a location-triggered manner. As a result, UE 350 may estimate its own position while in a low activity state, and trigger such Ax events in due course.

Figure 4A:
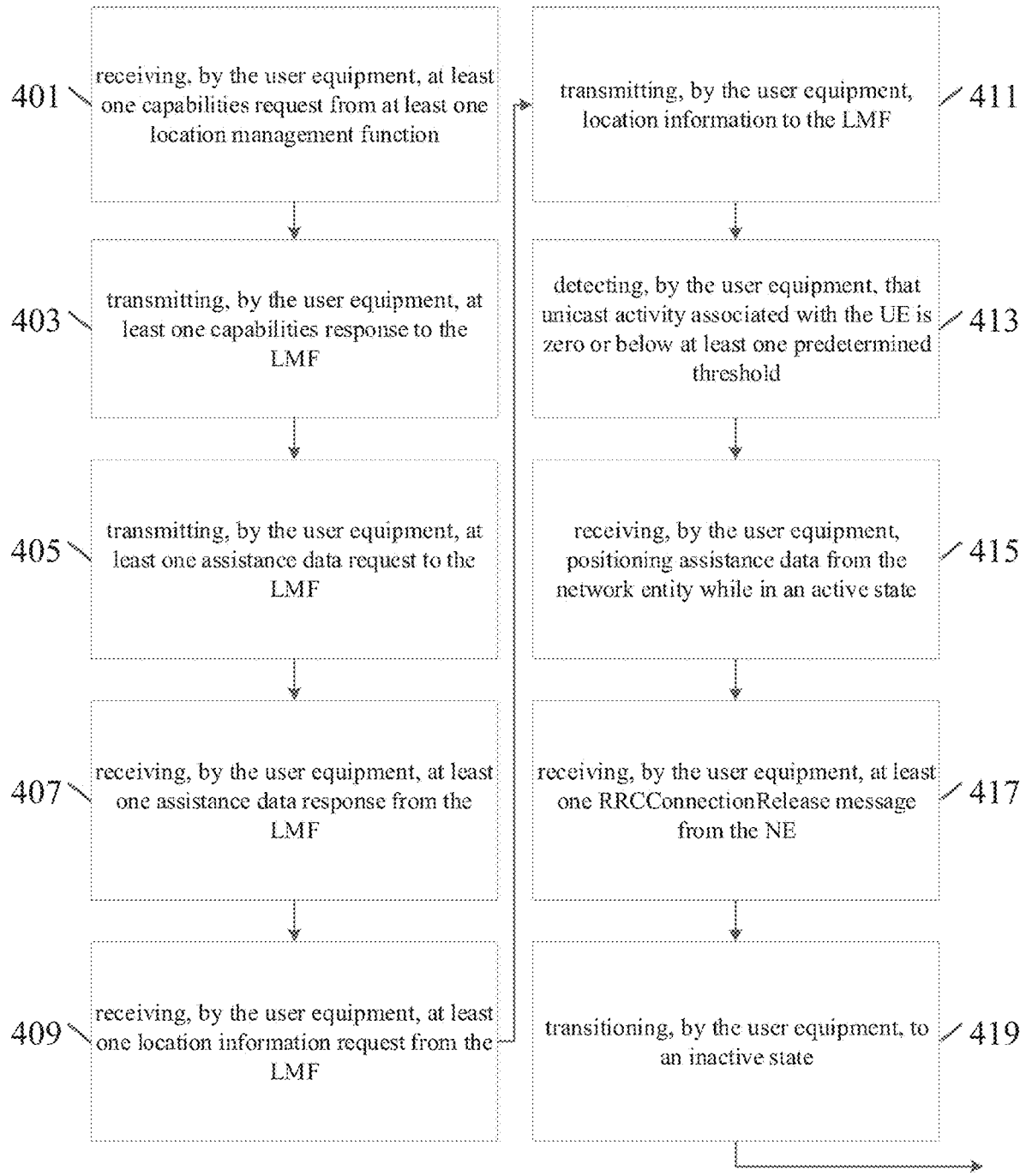
FIGS. 4A and 4B together illustrate an example of a method performed by a user equipment according to certain example embodiments.
Figure 4B:
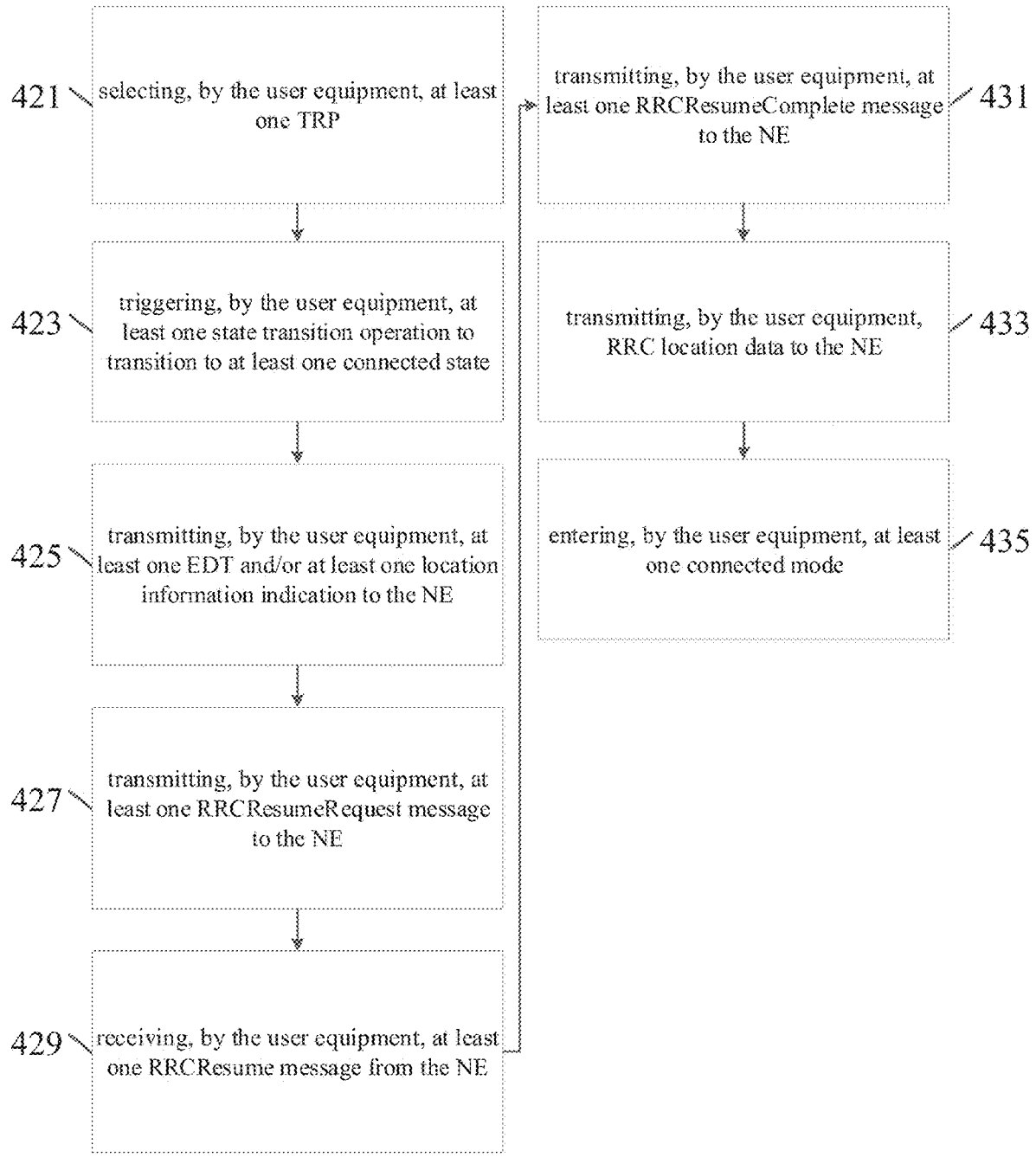
Figure 7:
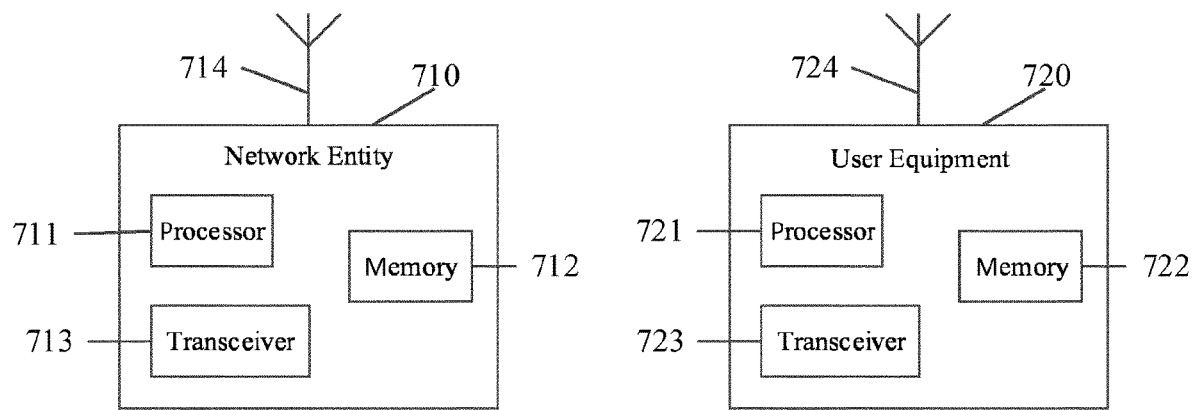
FIG. 7 illustrates an example of a system according to certain example embodiments.

FIGS. 4A and 4B illustrate an example of a method that may be performed by a UE, such as UE 720 in FIG. 7. In step 401, the UE may receive at least one capabilities request from at least one LMF, and in step 403, the UE may transmit at least one capabilities response back to the LMF. In step 405, the UE may also transmit at least one assistance data request to the LMF.

In step 407, the UE may receive at least one assistance data response from the LMF, and in step 409, the UE may receive at least one location information request from the LMF. In step 411, the UE may transmit location information to the LMF. In certain embodiments, the location of the UE may be known using the normal location service procedures, including the last known location of the UE in the network, i.e., an NE and/or the LMF.

In step 413, the UE may detect that unicast activity associated with the UE is zero or below at least one predetermined threshold. For example, the at least one predetermined threshold may be based upon empty data buffers. In step 415, the UE may receive positioning assistance data from the network entity while in an active state, such as RRC_ACTIVE. The positioning assistance data may be associated with at least one configured RNA, and/or may be associated with at least one UE-based and/or at least one UE-assisted positioning method. For example, the positioning assistance data may comprise information related to the at least one UE-based and/or at least one UE-assisted positioning method.

In some embodiments, the positioning assistance data may comprise at least one weight and/or reliability indication for at least one TRP coordinate. For example, the at least one weight and/or reliability indication may be configured for the UE to determine which, if any, TRPs it should attempt to measure, and/or which TRPs, if any, should be weighted during positioning measurements. The at least one weight and/or reliability indication provides the ability for multiple TRPs to be deployed in a variety of locations, for example, at locations above obstacles to provide LOS signals and more accurate measurements, and at locations below obstacles which provide less accurate measurements due to reflections and multipath propagation.

In various embodiments, multipath propagation, and resulting inaccuracies, may be addressed using at least one machine learning solution by the NE, the LMF, and/or an AMF. For example, at least one machine learning model may generate at least one predicted location based upon at least one measurement on at least one cell reported by the UE. Additionally or alternatively, at least one machine learning training phase may be based upon respective measurements by the UE across at least one consecutive time instance, enabling predictions of future locations of the UE and associating these predictions with at least one configured RNA. In certain embodiments, such machine learning techniques may improve line of sight detection and/or estimated location with respect to the true location of the UE during positioning. Since distortions due to line of sight and/or time-variant propagation delay may affect the measured RSTD, it is desirable to use these machine learning techniques to reduce this effect.

In some embodiments where the UE performs periodic reporting, if the location-enhanced trigger event is not configured to trigger at least one measurement report within at least one configured time window, the NE and/or the LMF may trigger at least one RRCReconfiguration message to the UE, for example, where the UE has stopped or modified at least one mobility profile and/or has not entered at least one RNA.

In step 417, the UE may receive at least one RRCConnectionRelease message from the NE. In some embodiments, the at least one RRCConnectionRelease message may comprise at least one positioning request during an inactive state, such as RRC_INACTIVE state. Additionally or alternatively, the UE may receive at least one RRCReconfiguration message from the NE comprising at least one measurement configuration configured for positioning measurement and/or mobility. Furthermore, the UE may receive at least one location aware trigger from the NE configured to cause the UE to report, based upon at least one positioning method used by the UE, at least one UE location and/or at least one UE positioning measurement data. This may be performed during a transition to a connected state, such as RRC_CONNECTED, or using an early data transmission, such as described in 3GPP NR, Rel-15.

In some embodiments, the UE may receive at least one RAT-dependent and/or at least one RAT-independent positioning measurement configuration, and/or at least one reporting event when unicast activity of the UE is stopped or below at least one predefined threshold.

In step 419, as a result of unicast activity being detected as stopped or below at least one predefined threshold, the UE may enter an inactive state, such as RRC_INACTIVE. In various embodiments, the UE may perform at least one standard cell re-selection measurement within at least one RNA and/or may transmit at least one RNA update indication to the NE and/or the LMF if the UE moves outside at least one mobility route of the RNA. The an inactive state may be entered with at least one RAT-dependent and/or RAT-independent positioning measurement configuration.

As noted above, the UE may be configured with at a UE-based method or UE-assisted method. If the UE is configured with a UE-based method, the UE may continue the positioning session as long as the UE stays within the at least one RNA. In some embodiments, the UE may perform measurements based upon one or more of known locations of TRPs, relative locations of TRPs, movement relative to the configured reference point, and movement relative to the configured trigger event area.

Alternatively, if the UE is configured with a UE-assisted method, the UE may continue to measure positioning-specific measurements, for example, the positioning reference signals such as PRS for the case of OTDOA method. Furthermore, the UE may update/overwrite previous measurements at a predetermined rate such that the latest measurements would be available to be reported to the network upon request.

In step 421, while in an inactive state, the UE may select at least one TRP, for example, when the UE moves within the at least RNA without notifying the NE and/or the LMF. In some embodiments, based upon the at least one RRCRelease message and/or at least one RRCReconfiguration message, the UE may use at least one positioning measurement method, and associated configuration, within the at least one RNA. The UE may choose at least one configured TRP according to at least one predetermined quality metric associated with at least one RNA.

In various embodiments, when the UE applies at least one UE-based method, the UE may maintain an exact location if at least one TRP is known, and/or a relative location to at least one previously known location. Additionally or alternatively, the UE may repeatedly update at least one positioning measurement based upon at least one configuration, for example, such that at least one most recent measurement may be available to report to the NE and/or the LMF upon receiving at least one request for location measurement data.

In step 423, while in an inactive state, the UE may trigger at least one state transition operation to transition to at least one connected state, such as RRC_CONNECTED, for example, when entering and/or leaving at least one RNA, such as illustrated in FIG. 2. For example, the UE may trigger at least one RNA update, and/or may report at least one location when leaving the at least one RNA.

In step 425, when configured with at least one location aware event trigger, the UE may transmit at least one EDT and/or at least one location information indication to the NE. In some embodiments, the at least one EDT may comprise at least one indication of the location of the UE and/or at least one positioning measurement performing during an inactive state of the UE, such as RRC_INACTIVE. Additionally or alternatively, the at least one location information indication may be comprised within at least one random access procedure message 3.

In step 427, when configured with at least one location aware event trigger, the UE may transmit at least one RRCResumeRequest message to the NE, which may be configured to trigger at least one transition to a connected state, such as RRC_CONNECTED.

In step 429, the UE may receive at least one RRCResume message from the NE. In some embodiments, based upon the positioning method applied by the UE, the at least one RRCResume message may comprise at least one indication configured to report the location of the UE and/or positioning measurements of the UE.

In step 431, the UE may transmit at least one RRCResumeComplete message to the NE, which, for example, may comprise at least one location and/or at least one positioning measurement. In step 433, the UE may transmit RRC location data to the NE, which, for example, may comprise at least one location data measurement performed during an inactive state of the UE.

In step 435, the UE may enter at least one connected mode, such as RRC_CONNECTED, and may be configured to report the location of the UE to the LMF, and/or to report the latest positioning measurements. For example, the UE may report its location and/or at least one positioning measurement to the LMF using at least one LTE positioning protocol (LPP) independent. Additionally or alternatively, where the LMF is configured as an LMC, at least one RRC protocol may be used to transmit the location of the UE and/or at least one positioning measurement to the LMC. For UE-based methods, the latest estimated position may be used, while for UE-assisted methods, at least the latest measurement may be reported to the network to resume the position of the UE. In some embodiments, where the UE is configured with at least one UE-based method, the UE may trigger at least one Ax event, such as A1, A2, A3, etc., when in a low activity state, such as RRC_INACTIVE, in a location-triggered manner. As a result, the UE may estimate its own position while in a low activity state, and trigger such Ax events in due course.

Figure 5:
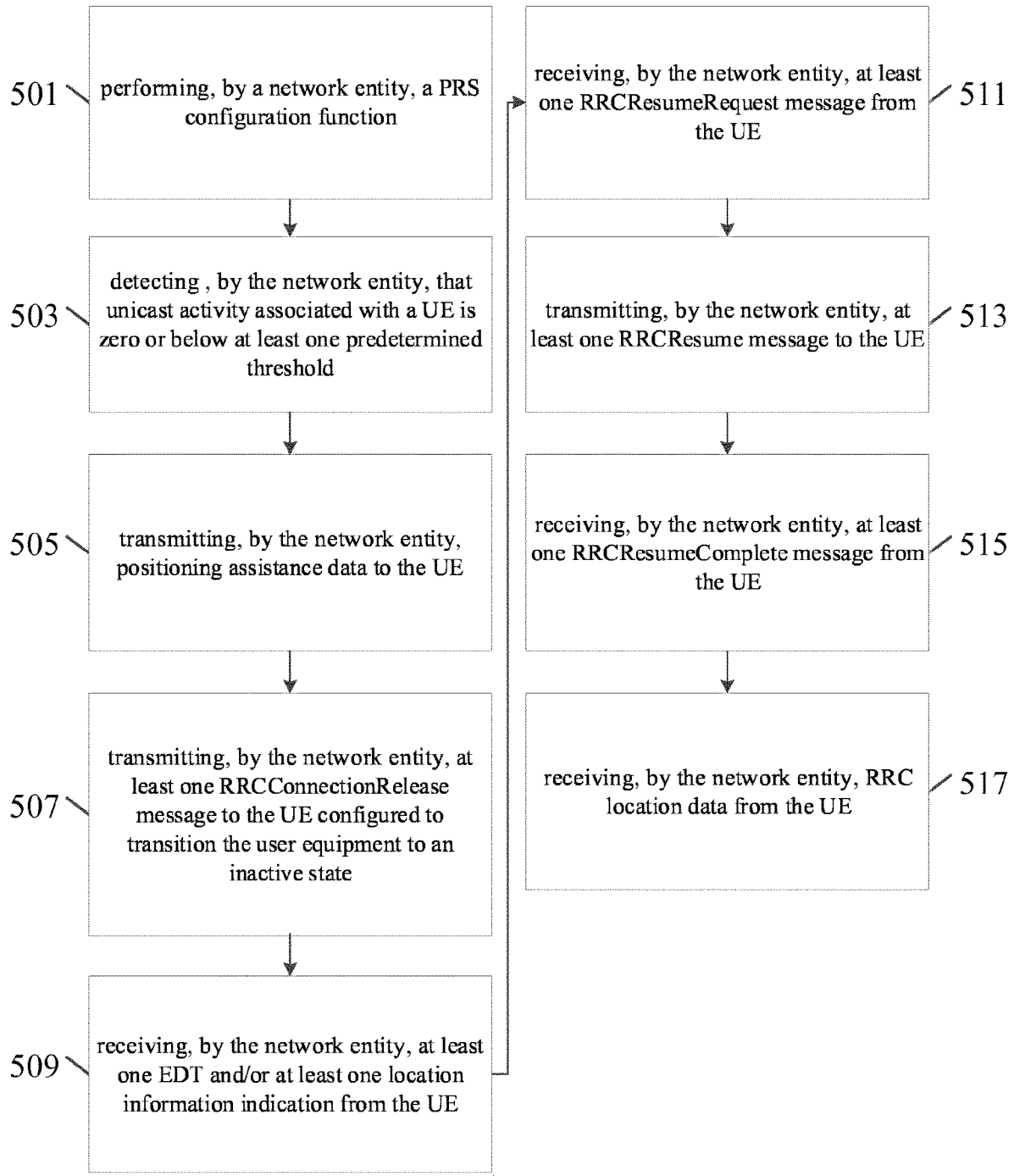
FIG. 5 illustrates an example of a method performed by a network entity according to certain example embodiments.

FIG. 5 illustrates an example of a method that may be performed by a NE, such as network entity 710 in FIG. 7. In step 501, the NE may perform PRS configuration actions. For example, such actions may correspond with the dynamic configuration of PRS, such that, depending on the positioning requests in a given area and the overall resource availability, the amount of resources allocated for PRS transmissions is adjusted. In step 503, the NE may detect that unicast activity associated with a UE is zero or below at least one predetermined threshold. For example, the at least one predetermined threshold may be based upon empty data buffers.

In step 505, the NE may transmit positioning assistance data to the UE, which may be in an active state, such as RRC_ACTIVE. The positioning assistance data may be associated with at least one configured RNA, and/or may be associated with at least one UE-based and/or at least one UE-assisted positioning method. For example, the positioning assistance data may comprise information related to the at least one UE-based and/or at least one UE-assisted positioning method.

In some embodiments, the positioning assistance data may comprise at least one weight and/or reliability indication for at least one TRP coordinate. For example, the at least one weight and/or reliability indication may be configured for the UE to determine which, if any, TRPs it should attempt to measure, and/or which TRPs, if any, should be weighted during positioning measurements. The at least one weight and/or reliability indication provides the ability for multiple TRPs to be deployed in a variety of locations, for example, at locations above obstacles to provide LOS signals and more accurate measurements, and at locations below obstacles which provide less accurate measurements due to reflections and multipath propagation.

In various embodiments, multipath propagation, and resulting inaccuracies, may be addressed using at least one machine learning solution by the NE, the LMF, and/or the AMF. For example, at least one machine learning model may generate at least one predicted location based upon at least one measurement on at least one cell reported by the UE. Additionally or alternatively, at least one machine learning training phase may be based upon respective measurements by the UE across at least one consecutive time instance, enabling predictions of future locations of the UE and associating these predictions with at least one configured RNA. In certain embodiments, such machine learning techniques may improve line of sight detection and/or estimated location with respect to the true location of the UE during positioning. Since distortions due to line of sight and/or time-variant propagation delay may affect the measured RSTD, it is desirable to use these machine learning techniques to reduce this effect.

In some embodiments where the UE performs periodic reporting, if the location-enhanced trigger event is not configured to trigger at least one measurement report within at least one configured time window, the NE may trigger at least one RRCReconfiguration message to the UE, for example, where the UE has stopped or modified at least one mobility profile and/or has not entered at least one RNA.

In step 507, the NE may transmit at least one RRCConnectionRelease message to the UE configured to transition the UE to an inactive state in response to a determination that unicast activity with the user equipment is below at least one pre-determined threshold. In some embodiments, the at least one RRCConnectionRelease message may comprise at least one positioning request during an inactive state, such as RRC_INACTIVE state. Additionally or alternatively, the NE may transmit at least one RRCReconfiguration message to the UE comprising at least one measurement configuration configured for positioning measurement and/or mobility. Furthermore, the NE may transmit at least one location aware trigger to the UE configured to cause the UE to report, based upon at least one positioning method used by the UE, at least one UE location and/or at least one UE positioning measurement data. This may be performed during a transition to a connected state, such as RRC_CONNECTED, or using an early data transmission, such as described in 3GPP NR, Rel-15.

In some embodiments, the NE may transmit at least one RAT-dependent and/or at least one RAT-independent positioning measurement configuration, and/or at least one reporting event when unicast activity of the UE is stopped or below at least one predefined threshold.

In step 509, when configured with at least one location aware event trigger, the NE may receive at least one EDT and/or at least one location information indication from the UE. In some embodiments, the at least one EDT may comprise at least one indication of the location of the UE and/or at least one positioning measurement performing during an inactive state of the UE, such as RRC_INACTIVE. Additionally or alternatively, the at least one location information indication may be comprised within at least one random access procedure message 3. In response, in step 511, the NE may transmit the at least one location information indication to the LMF, which may be configured to complement at least one previously reported location of the UE.

In step 511, when configured with at least one location aware event trigger, the NE may receive at least one RRCResumeRequest message from the UE, which may be configured to trigger at least one transition to a connected state, such as RRC_CONNECTED.

In step 513, the NE may transmit at least one RRCResume message to the UE. In some embodiments, based upon the positioning method applied by the UE, the at least one RRCResume message may comprise at least one indication configured to report the location of the UE and/or positioning measurements of the UE.

In step 515, the NE may receive at least one RRCResumeComplete message from the UE, which, for example, may comprise at least one location and/or at least one positioning measurement.

In step 517, the NE may receive RRC location data from the UE, which, for example, may comprise at least one location data measurement performed during an inactive state of the UE.

Figure 6A:
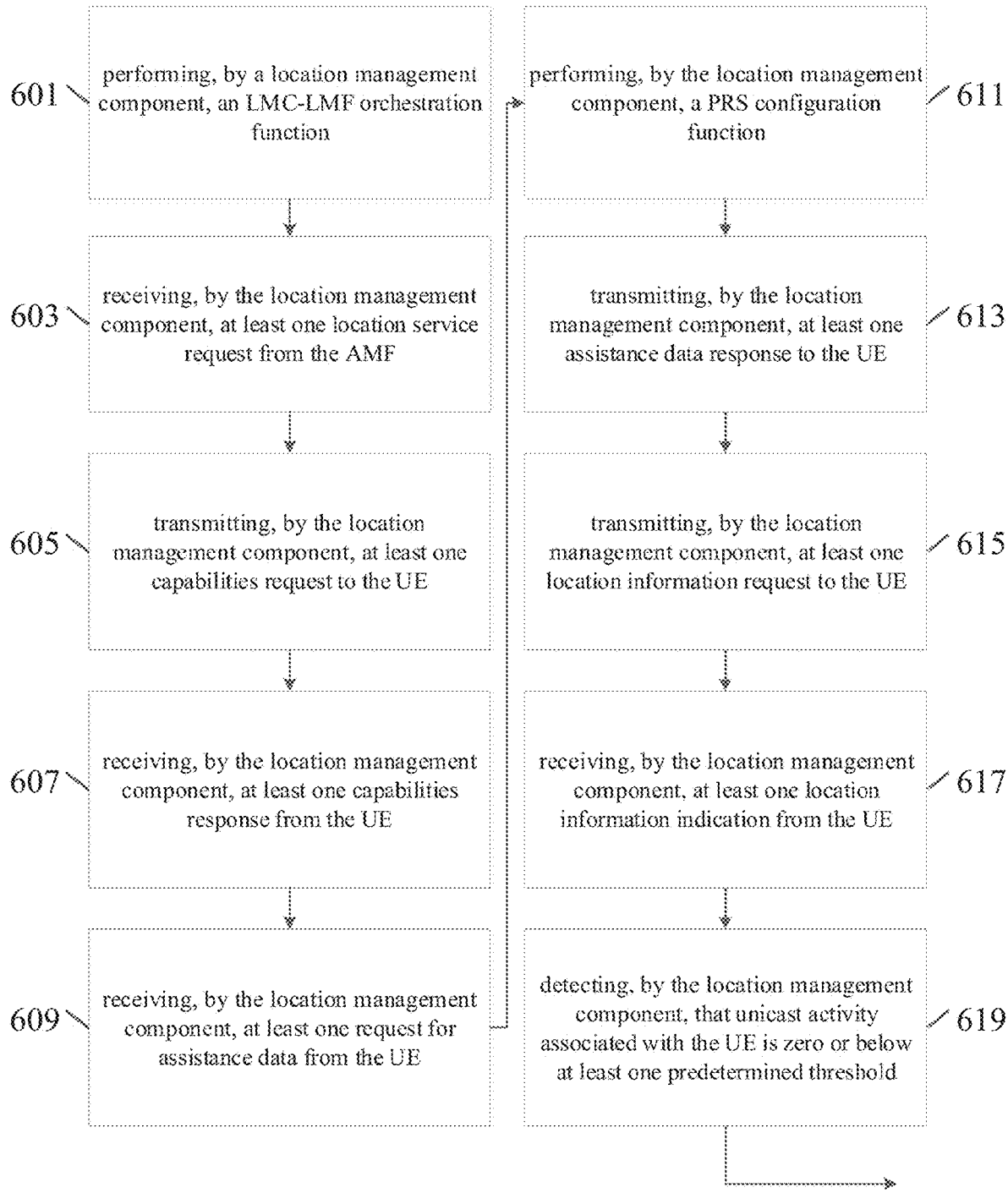
FIGS. 6A and 6B together illustrate an example of a method performed by another network entity according to certain example embodiments.
Figure 6B:
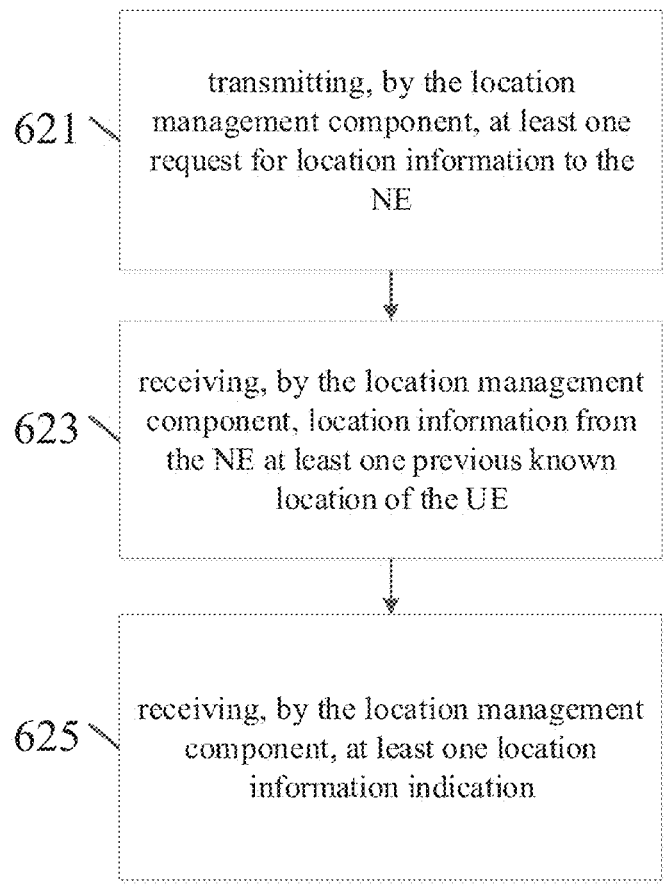

FIGS. 6A and 6B illustrate an example of a method that may be performed by a LMF or LMC, such as network entity 710 in FIG. 7. In step 601, in order to begin configuring and enabling the positioning of the UE in a low activity state, such as RRC_INACTIVE, the LMF may perform an LMC-LMF orchestration activities. For example, such orchestration activities may comprise the signaling between the NE, LMF and AMF, specifying whether the NE or LMF should process a given positioning request based upon, for example, the positioning latency requirements of such request), as well as the actions taken in case future positioning requests arrive. In step 603, the LMF may receive at least one location service request from the AMF. In step 605, the LMF may transmit at least one capabilities request to the UE. In step 607, the LMF may receive at least one capabilities response from the UE. In step 609, the LMF may receive at least one request for assistance data from the UE. In step 611, the LMF may perform PRS configuration actions. For example, such actions may correspond to the dynamic configuration of PRS, such that, depending on the positioning requests in a given area and the overall resource availability, the amount of resources allocated for PRS transmissions is adjusted. In step 613, in response to the at least one request for assistance data, the LMF may transmit at least one assistance data response to the UE. In step 615, the LMF may transmit at least one location information request to the UE. In step 617, in response to the at least one location information request, the LMF may receive at least one location information indication from the UE. In certain embodiments, the location of the UE may be known using the normal location service procedures, including the last known location of the UE in the network, i.e., the LMF.

In step 619, the LMF may detect that unicast activity associated with the UE is zero or below at least one predetermined threshold. For example, the at least one predetermined threshold may be based upon empty data buffers.

In step 621, the LMF may transmit at least one request for location information to the NE. As an example, the LMF may transmit the at least one request for location information when the UE remains within the at least one RNA, and a result, not reported a new location according to the at least one location-aware trigger event. In response, at step 623, the LMF may receive location information from the NE, for example, at least one previous known location of the UE. In some embodiments, the location information may comprise at least one quality metric, such as RSRP, and/or may be based upon at least one threshold configured to limit the RSTD measurements reported, for example, to only report the most relevant RSTD measurement.

In the case of UE-assisted methods, the LMF in the core network or the LMC located at the last serving gNB-CU may host the positioning session. The LMF may provide the last known location of the UE to at least one requesting LCS client without requiring the UE to resume a connected state, such as RRC_CONNECTED, such as in response to at least one QoS in the request. For example, if the QoS indicates that a more precise location is required, the LMF may resume the connected state, provide the assistance data, and request at least one positioning measurement from the UE. In step 625, the LMF may receive at least one location information indication, which may be configured to complement at least one previously reported location of the UE.

FIG. 7 illustrates an example of a system according to certain example embodiments. In one example embodiment, a system may include multiple devices, such as, for example, network entity 710 and/or user equipment 720.

Network entity 710 may be one or more of a base station, such as an evolved node B (eNB) or 5G or New Radio node B (gNB), a serving gateway, a location management function, a location management component, a server, and/or any other access node or combination thereof. Furthermore, network entity 710 and/or user equipment 720 may be one or more of a citizens broadband radio service device (CBSD).

Network entity 710 may further comprise at least one gNB-CU, which may be associated with at least one gNB-DU. The at least one gNB-CU and at least one gNB-DU may be in communication via at least one F1 interface, at least one $X_n$-C interface, and/or at least one NG interface via a 5GC.

User equipment 720 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

One or more of these devices may include at least one processor, respectively indicated as 711 and 721. Processors 711 and 721 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 712 and 722. The memory may be fixed or removable. The memory may include computer program instructions or computer code contained therein. Memories 712 and 722 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 711 and 721 and memories 712 and 722 or a subset thereof, may be configured to provide means corresponding to the various blocks of FIGS. 3-6. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 7, transceivers 713 and 723 may be provided, and one or more devices may also include at least one antenna, respectively illustrated as 714 and 724. The device may have many antennas, such as an array of antennas configured for multiple input multiple output (MIMO) communications, or multiple antennas for multiple radio access technologies. Other configurations of these devices, for example, may be provided. Transceivers 713 and 723 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described above (see, for example, FIGS. 3-6). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 3-6. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain example embodiments described throughout this specification may be combined in any suitable manner in one or more example embodiments. For example, the usage of the phrases "certain example embodiments," "some example embodiments," "other example embodiments," or other similar language, throughout this specification refers to the fact that a particular feature, structure, or characteristic described in connection with the example embodiment may be included in at least one example embodiment of the present invention. Thus, appearance of the phrases "in certain example embodiments," "in some example embodiments," "in other example embodiments," or other similar language, throughout this specification does not necessarily refer to the same group of example embodiments, and the described features, structures, or characteristics may be combined in any suitable manner in one or more example embodiments.

One having ordinary skill in the art will readily understand that certain example embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the disclosure. In order to determine the metes and bounds of the disclosure, therefore, reference should be made to the appended claims.

Partial Glossary

3GPP 3rd Generation Partnership Project
5G 5th Generation Wireless System
AMF Access and Mobility Function
AS Access Stratum
BLER Block Error Rate
CN Core Network
CM Connection Management
C-RNTI Cell Radio Network Temporary Identifier
CSI-RS Channel State Information-Reference Signal
DRX Discontinuous Reception
DU Decentralized Unit
EDT Early Data Transmission
eMTC Enhanced Machine Type Communications
eNB evolved Node B
E-SMLC Evolved Serving Mobile Location Center
E-UTRAN Evolved Universal Mobile Telecommunications System Terrestrial Radio Access Network
gNB Next Generation Node B
IoT Internet of Things
IIoT Industrial Internet of Things
L3 Layer 3
LCS Location Client/Service
LMC Location Management Component
LMF Location Management Function
LOS Line of Sight
LPP Long-Term Evolution Positioning Protocol
LTE Long Term Evolution
MME Mobility Management Entity
NAS Non-Access Stratum
NE Network Entity
NG-RAN Next Generation Radio Access Network
NR New Radio (5G)
OAM Operation and Maintenance
OTDOA Observed Time Difference of Arrival
PRS Positioning Reference Signals
QoS Quality of Service
RACH Random Access Channel
RAN Radio Access Network
RAR Random Access Response
RLF Radio Link Failure
RNA Radio Access Network Notification Area
RRC Radio Resource Control
RSTD Reference Signal Time Difference
SSB Synchronization Signal Block
TNL Transport Network Layer
TRP Transmission Reception Point
UE User Equipment
UTDOA Uplink Time Difference of Arrival

We claim:

1. A method, comprising:
  transmitting, by a network entity, at least one positioning measurement configuration to a user equipment configured to transition the user equipment to an inactive state;
  receiving, by the network entity, at least one location message; and
  transmitting, by the network entity, at least one location message response, wherein the at least one location message response comprises:
  at least one last known location of the user equipment transmitted to a location management entity, or
  at least one last location-associated measurement by the user equipment transmitted to the location management entity,
  wherein:
  the at least one location message comprises at least one early data transmission comprising at least one location and measurement received from the user equipment operating in RRC INACTIVE, and the at least one location message response comprises the at least one early data transmission transmitted to the location management entity,
wherein:
the at least one location message comprises at least one RRC RESUME REQUEST from the user equipment, and
the at least one location message response comprises the at least one RRC RESUME to the user equipment, the method further comprising:
receiving, by the network entity, at least one RRC RESUME COMPLETE from the user equipment; and
receiving, by the network entity, at least one RRC location data from the user equipment,
wherein the at least one positioning measurement configuration comprises at least one radio access technology-dependent configuration and at least one radio access technology-independent positioning measurement configuration.

2. The method according to claim 1, wherein:
the at least one location message comprises at least one location information request received from at least one location management entity.

3. The method according to claim 2, wherein the location management entity is a location management function at a core network, or a location management component at a radio access network.

4. The method according to claim 1, wherein the at least one positioning measurement configuration comprises at least one reporting event when the unicast activity is below at least one pre-determined threshold.

5. A method, comprising:
receiving, by a user equipment, at least one positioning measurement configuration from a network entity in response to a determination that unicast activity with the user equipment is below at least one pre-determined threshold;
transitioning, by the user equipment, to an inactive mode; and
transmitting, by the user equipment, at least one location message to the network entity, wherein the at least one location message response comprises:
at least one last known location of the user equipment transmitted to theto a location management entity, or
at least one last location-associated measurement by the user equipment transmitted to the location management entity,
wherein the at least one positioning measurement configuration comprises at least one radio access technology-dependent configuration and at least one radio access technology-independent positioning measurement configuration and at least one reporting event when the unicast activity is below at least one pre-determined threshold,
wherein the user equipment is configured to perform measurements associated with at least one UE-based positioning method based on:
at least one known location of at least one transmission reception point;
at least one relative location of at least one transmission reception point;
at least one movement relative to at least one configured reference point; and
at least one movement relation to at least one configured trigger event area.

6. The method according to claim 5, wherein the receiving is in response to a determination that unicast activity with the user equipment is below at least one pre-determined threshold, wherein the predetermined threshold is based upon empty data buffers, and
wherein the method further comprises:
the user equipment receive positioning assistance data from the network entity while in an active state, the positioning assistance data being associated with at least one user equipment-based method and at least one user equipment-assisted positioning method, wherein the positioning assistance data comprises information related to the at least one user equipment-based method and at least one user equipment-assisted positioning method, wherein the positioning assistance data comprises at least one weight and at least one reliability indication for at least one TRP coordinate, wherein the at least one weight and the at least one reliability indication are configured for the UE to determine which TRPs it should attempt to measure, and which TRPs should be weighted during positioning measurements.

7. The method according to claim 6, wherein:
the at least one location message comprises at least one early data transmission comprising at least one location measurement and at least one location-associated measurement.

8. The method according to claim 7, wherein:
the at least one location message comprises at least one RRC RESUME REQUEST, the method further comprising:
receiving, by the user equipment, at least one RRC RESUME from the network entity;
transmitting, by the user equipment, at least one RRC RESUME COMPLETE message to the network entity; and
transmitting, by the user equipment, RRC location data to the network entity.

9. The method according to claim 5, wherein the user equipment is configured to select at least one transmission reception point based on at least one quality metric associated with at least one radio access network notification area.

10. The method according to claim 9, wherein the user equipment is configured to report at least one location of the user equipment or the latest location-associated measurement upon detection of leaving at least one radio access network notification area.

11. The method according to claim 10, wherein the user equipment is configured to periodically perform at least one positioning-specific measurement when performing at least one user equipment-assisted positioning method and to report at least the latest location-associated measurement to the network.

12. The method according to claim 11, wherein the user equipment is configured to continue at least one positioning session while located within at least one radio access network notification area when performing at least one user equipment-based positioning method.

13. An apparatus, comprising at least one processor and at least one memory including computer program code, wherein the at least one memory and the computer program code are configured to, with the at least one processor, cause the apparatus to:
receive, by a user equipment, at least one positioning measurement configuration from a network entity in response to a determination that unicast activity with the user equipment is below at least one pre-determined threshold;

transition, by the user equipment, to an inactive mode; and
transmit, by the user equipment, at least one location message to the network entity, wherein the at least one location message response comprises:
at least one last known location of the user equipment transmitted to a location management entity, or
at least one last location-associated measurement by the user equipment transmitted to the location management entity,
wherein the at least one positioning measurement configuration comprises at least one radio access technology-dependent configuration and at least one radio access technology-independent positioning measurement configuration,
wherein the at least one positioning measurement configuration comprises at least one reporting event when the unicast activity is below at least one pre-determined threshold,
wherein the user equipment is configured to perform measurements associated with at least one UE-based positioning method based on:
at least one known location of at least one transmission reception point;
at least one relative location of at least one transmission reception point;
at least one movement relative to at least one configured reference point; and
at least one movement relation to at least one configured trigger event area.

* * * * *